United States Patent [19]

Klötzer et al.

[11] Patent Number: 5,980,795
[45] Date of Patent: Nov. 9, 1999

[54] METHOD OF PRODUCING HOLLOW FIBER POLYMER MEMBRANES

[75] Inventors: Rebecca Klötzer, Hamburg; Bernd Seibig, Geesthacht; Dieter Paul, Kleinmachnow; Klaus-Viktor Peinemann, Geesthacht, all of Germany

[73] Assignee: GKSS-Forschungszentrum Geesthacht GmbH, Geesthacht, Germany

[21] Appl. No.: 08/969,370

[22] Filed: Nov. 28, 1997

Related U.S. Application Data

[63] Continuation-in-part of application No. PCT/DE96/00897, May 23, 1996.

[30]     Foreign Application Priority Data

Jun. 1, 1995 [DE] Germany .......................... 195 20 188

[51] Int. Cl.⁶ .................................................. D01D 5/247
[52] U.S. Cl. ........................... 264/41; 264/51; 264/209.3; 264/209.5; 264/235; 264/563
[58] Field of Search ........................... 264/41, 51, 209.3, 264/209.5, 235, 563

[56]         References Cited

U.S. PATENT DOCUMENTS 1,487,807  3/1924  Rousset .
3,095,258  6/1963  Scott .
3,745,202  7/1973  Riggleman et al. .
3,873,653  3/1975  Meinecke et al. .
4,164,603  8/1979  Siggel et al. ........................... 264/51 X
5,232,642  8/1993  Kamo et al. .

FOREIGN PATENT DOCUMENTS 28 33 493  2/1980  Germany .
 927 582   5/1963  United Kingdom .

OTHER PUBLICATIONS

Abstract of Japan 1–14,315 (Published Jan. 18, 1989).

*Primary Examiner*—Leo B. Tentoni
*Attorney, Agent, or Firm*—Klaus J. Bach

[57]         ABSTRACT

In a method of producing hollow fiber membranes, wherein a molten polymer charged with a gas under pressure is provided in an extrusion apparatus, the polymer melt including the gas under pressure is extruded from the extrusion apparatus through a hollow fiber-forming extrusion nozzle with a predetermined pressure drop which provides for a concurrent expansion of the gas contained in the polymer melt thereby forming a porous hollow fiber membrane.

12 Claims, No Drawings

METHOD OF PRODUCING HOLLOW FIBER POLYMER MEMBRANES

This is a Continuation-In-Part of International Application, PCT/DE96/00897, filed May 23, 1996 and claiming the priority of German application 195 20 188.4 filed Jun. 1, 1995.

BACKGROUND OF THE INVENTION

The invention resides in a method of producing polymer hollow fiber membranes, wherein molten polymer is conducted through an extruder in order to form the hollow fiber membranes.

Hollow fiber membranes of this type are used for the separation of material mixtures following a sieve-like separating mechanism. The type and size of pores formed in these membranes particularly of the pores at the membrane surface are important for the separation properties of the membranes. Because of a high porosity, the hollow fiber membranes have achieved a high permeability per volume unit.

In a known method of this type (U.S. Pat. No. 3,745,202), a mixture of polymers and plasticizers is extruded from the melt whereby a hollow fiber is formed which is stretched in a molten state and then cured in air, in a water bath or in an aqueous solution of a plasticizer. In this way, a porous hollow fiber is formed. The non-volatile plasticizer must subsequently be washed out. The actual membrane is then formed by the following treatment with hot water and, subsequently with an aqueous solution of dioxane, formic acid or a substance which is a solvent with respect to polymers. The additives remaining in the membrane must be removed at the end of the process in an expensive manner.

In addition, a multitude of other processes are known wherein hollow fiber membranes are produced by extrusion of polymers from a melt in a way similar to that disclosed in the process described before.

U.S. Pat. No. 3,873,653 discloses the manufacture of hollow fiber membranes from cellulose acetate, wherein dense hollow fibers are extruded from the melt and the actual membrane is formed subsequently by chemical treatment with formamide.

DE patent 28 33 493 discloses a method wherein a binary mixture of polypropylene and a monomer amine is extruded above the separation temperature and the membrane is formed by subsequent precipitation into a bath of the same amine below the separation temperature. Subsequently, the precipitation agent must be removed from the membrane. This known method, however, is disadvantageous in as much as the hollow fibers formed must be treated after the actual extrusion process in a more or less expensive physical or chemical after treatment steps in order to obtain the desired membrane properties. In these steps, a number of compounds such as solvents, plasticizers and others need to be removed in an expensive manner since the hollow fiber membrane would be unsuitable for most applications if these additional compounds would remain in the hollow fiber membrane.

It can be assumed that the known methods including the method described initially either require, for the production of the hollow fiber membrane, solvents which need to be removed in subsequent processing steps and of which small amounts remain in the finished membrane—which is disadvantageous—or that chemical substances are used as additives during the performance of the process such as plasticizers, pore formers etching chemicals, etc., which also need to be removed from the membrane by expensive procedures such as extraction, filtering and washing or which remain in the membrane as residues.

Furthermore, methods are known, wherein hollow fiber membranes are extruded from a melt of pure polymers without additional compounds. A known process of this type is described in JP-01 014 315. In this case, a thermoplastic polymer is extruded from the melt and is tempered at a temperature below the melting temperature for at least one minute in order to reach a crystallization degree of 25–50%. Subsequently, a number of cold stretching steps are performed below the melting temperature and a bottle-neck-type stretching is performed above the melting temperature and pores are formed. Similar additional processes are known, wherein pores are formed by thermal-mechanical post treatment in melt-extruded dense hollow fibers. JP-01 099 610 and JP 01 027 607, for example, disclose the manufacture of hollow fiber membranes of poly-(ethylene-co-chlorotrifluoroethylene) and U.S. Pat. No. 5,232,642 discloses the manufacture of hollow fiber membranes from polypropylene. The methods referred to above are different in the various thermal and mechanical process steps, which are adapted to the particular polymer. The duration of the heat treatment for the predetermined crystallization of the polymers varies between 1 minute and 30 minutes.

The known processes, including those referred to above for the manufacture of hollow fiber membranes by extrusion from a pure polymer melt after extrusion from the melt and subsequent thermal and mechanical after treatment, have the disadvantage that they can be used only for partially crystalline or crystallizable polymers and that it is difficult to achieve high spinning speeds because of the duration of the heat treatment.

It is therefore the object of the present invention to provide a process of the type referred to above with which, however, high spinning speeds of more than 2000 m/min can be achieved, wherein there is no need for additives or additional substances so that these substances do not need to be removed from the hollow fiber membranes in an expensive manner. The process further is to be simple and continuous.

SUMMARY OF THE INVENTION

In a method of producing hollow fiber membranes, wherein a molten polymer charged with a gas under pressure is provided in an extrusion apparatus, the polymer melt including the gas under pressure is extruded from the extrusion apparatus through a hollow fiber-forming extrusion nozzle with a predetermined pressure drop which provides for a concurrent expansion of the gas contained in the polymer melt thereby forming a porous hollow fiber membrane.

With the process according to the invention, the microcellular spaces (pores) are formed in the hollow fiber membrane in a very simple and elegant and also reproducible manner as they are automatically formed when the hollow fiber membrane leaves the extruder. In addition, the process has the advantage that it can be performed without the use of chemically reactive foreign compounds so that an aftertreatment for the removal of compounds which detrimentally affect the finished hollow fiber membrane is not necessary. It is noted that, in a membrane manufactured in accordance with the method according to the invention, there are not even residues of additives as they remain in the known methods of this type. Preferably, there are no particular requirements concerning the type of gas used for charging the polymer. It can simply be nitrogen, carbon dioxide or any other non-reactive gas or gas mixture. The expansion of the gas after the discharge of the polymer or, respectively, the so formed hollow fiber membrane from the extrusion apparatus practically leads to a foaming of the molten polymer and, consequently, to the formation of pores in the membrane wall.

Preferably, the gas-charged polymer is heated to a temperature above the softening temperature before it is supplied to the extrusion apparatus. With amorphous polymers, this temperature is preferably above their glass transition temperature. With crystalline polymers, this temperature is preferably above their melting temperature. Accordingly, it is possible with the process according to the invention to combine amorphous as well as partial-crystalline polymers for the formation of hollow fiber membranes, whereby the process according to the invention can be adapted to the different softening temperatures of different polymers.

Furthermore, the process can be used not only in connection with polymers, but also with polymer mixtures, that is, the process according to the invention is not limited to particular polymers. Rather, it can be used in connection with all thermoplastic polymers depending on the desired membrane parameters, the desired application and utilization of the membrane.

There are different ways of charging the polymer with the gas before the melt is extruded from the extrusion apparatus. It is possible, for example, to charge the polymer with the gas in an autoclave arranged ahead of the extrusion apparatus, but it is also possible to charge the polymer with the gas directly in the extrusion apparatus. The various possibilities for charging the polymer with gas are selected depending on the desired properties of the polymer membrane and/or depending on the apparatus available for the process.

As already mentioned, a chemical after-treatment of the hollow fiber membrane leaving the extrusion apparatus is not necessary since the hollow fiber membrane is made without additives. Still, it can be advantageous to stretch the hollow fiber membrane upon leaving the extrusion apparatus in order to modify its physical dimensions, that is, in order to cause it to assume the desired dimensions. Such a procedure, however, is well known in the art.

In order to influence the separation properties of the hollow fiber membrane after it has left the extrusion apparatus, the hollow fiber membrane is preferably heated or cooled during the stretching procedure, depending on the circumstances wherein the cooling generally results in a stabilization of the hollow fiber membrane.

Furthermore, it is reasonable in another advantageous embodiment of the invention that, during the extrusion procedure, a second gas is introduced into the interior space formed in the hollow fiber membrane in order to modify the internal wall of the hollow fiber membrane. In this way, the separation properties of the membrane can be adjusted particularly in the area of the inside wall of the membrane.

The properties of the hollow fiber membrane can be further adjusted after the membrane leaves the extrusion apparatus by chosing for the treatment of the inner space of the hollow fiber membrane a second gas, which is different, by its composition and/or pressure, from the polymer charging gas.

As mentioned earlier, the process according to the invention can well be used with thermoplastic polymers as well as thermoplastic polymer mixtures. Accordingly, in the extrusion process for the polymer a plurality of different polymers and/or polymer mixtures can be extruded at the same time to form a predetermined porosity gradient over the cross-section of the hollow fiber membrane.

With the process according to the invention, hollow fiber membranes can be made which have properties that permit their use in the human or veterinary medicine and also in the bio-or environmental technological areas, that is, in areas where even the smallest residual amounts of additives in the membrane body are disadvantageous or unacceptable. The hollow fiber membranes made in accordance with the present invention have a very high biocompatibility so that they are well suited for use in the medical field.

The invention will be described below on the basis of an example.

DESCRIPTION OF A PREFERRED EMBODIMENT

A thermoplastic polymer or a thermoplastic polymer mixture is charged in an autoclave under high pressure with a gas such as nitrogen or carbon dioxide, a gas mixture or any other suitable gas. The gas-charged polymer is heated in an extrusion apparatus to a temperature above the softening temperature, that is, for amorphous polymers, above the glass transition temperature and for partial crystalline polymers above the melting temperature. The gas-charged polymer is then formed in a suitable manner into a hollow fiber by means of an extrusion nozzle or respectively, an extrusion tool. The gas-charged polymer is over-saturated with gas dissolved therein under pressure. Immediately upon leaving the extrusion apparatus, the hollow fiber enters an area with a predetermined lower pressure so that the polymer then expands. This results in a foaming of the molten polymer and, as a result, to the formation of pores in the wall of the hollow fiber membrane being formed. The hollow fiber membrane is stabilized by increasing the viscosity, by desorption of the gas dissolved therein and by cooling. The size and shape of the pores are adjusted by the extrusion parameters such as pressure, temperature speed and shape of the extruder screw as well as the nozzle shape of the extrusion apparatus.

Subsequently, the hollow fiber membrane can be subjected to an additional stretching procedure to adapt the hollow fiber membrane to a desired dimension. In this procedure, a second gas serving as an inner support gas may be utilized, which is introduced during the extrusion procedure into the hollow fiber membrane interior. The second gas is intended to modify the internal wall area of the hollow fiber membrane. In order to influence the already formed hollow fiber membrane in an advantageous manner, the composition of this second gas disposed in the interior of the hollow fiber membrane is so selected that it has another composition and/or pressure than the gas with which the polymer was charged to saturation. Basically, it is possible to extrude different polymers in a single process step or also polymer mixtures. In this way, predetermined porosity properties of the hollow fiber membrane so made and also a certain porosity gradient over the hollow fiber cross-section can be obtained.

The process described herein permits the continuous manufacture of porous hollow fiber membranes with a high processing speed of more than 2000 m/min. The process is basically suitable for all amorphous and also partially crystalline polymers which are suitable for the formation of membranes. In addition, the method permits, with the use of these polymers, to provide for an asymmetric porosity distribution over the membrane cross-section while maintaining the high manufacturing speed for the hollow fiber membranes. An after treatment is not required, except possibly for stretching for an adjustment of the dimensions of the hollow fiber membrane since there will be no residues from additives in the hollow fiber membrane made in accordance with the process according to the invention.

What is claimed is:

1. A method of producing hollow fiber membranes by extrusion from an exrusion apparatus through a hollow fiber-forming extrusion nozzle, comprising the steps of:

providing in the extrusion apparatus a polymer melt charged with gas under pressure, and extruding said melt including said gas under pressure from said extrusion apparatus through said hollow fiber-forming extrusion nozzle with a predetermined pressure drop and a concurrent expansion of the gas contained in said polymer melt so as to form hollow fiber membrane with porous membrane walls.

2. A method according to claim 1, wherein said gas-charged polymer is heated in said extrusion apparatus to a temperature above the softening temperature of said polymer.

3. A method according to claim 2, wherein said polymer is an amorphous polymer and is heated to a temperature above the glass transition temperature of said amorphous polymer.

4. A method according to claim 2, wherein said polymer is a crystalline polymer and is heated to a temperature above the melting temperature of said crystalline polymer.

5. A method according to claim 1, wherein said polymer is a mixture of different polymers.

6. A method according to claim 1, wherein said polymer is charged with said gas in an autoclave arranged in front of said extrusion apparatus.

7. A method according to claim 1, wherein said polymer is charged with said gas in said extrusion apparatus.

8. A method according to claim 1, wherein said hollow fiber membrane leaving said extrusion apparatus is stretched to modify its dimension.

9. A method according to claim 8, wherein said hollow fiber membrane is heat treated while it is being stretched.

10. A method according to claim 9, wherein said hollow fiber membrane is filled, during extrusion, with a second gas or gas mixture to modify its inner wall area.

11. A method according to claim 10, wherein the composition and pressure of the gas with which the polymer is charged and those of the gas filled into the hollow fiber membrane differ.

12. A method according to claim 5, wherein the extrusion procedure of the polymer is so that different polymers or mixtures are extruded concurrently through said extrusion nozzle to provide a hollow fiber membrane with a predetermined porosity gradient distributed over the cross-section of the hollow fiber membrane.

* * * * *